United States Patent [19]

Knudsen

[11] Patent Number: 4,858,482
[45] Date of Patent: Aug. 22, 1989

[54] SCISSOR MECHANISM IN PARTICULAR FOR LIFT TABLES

[76] Inventor: Erik Knudsen, Hovedgaden 79, Brovst, Denmark, DK-9460

[21] Appl. No.: 167,293

[22] Filed: Mar. 11, 1988

[51] Int. Cl.⁴ ............................ F16H 21/44; B66F 3/22
[52] U.S. Cl. ....................................... 74/110; 248/421; 254/9 C; 254/122; 384/42
[58] Field of Search ............... 248/421, 588; 254/9 R, 254/9 B, 9 C, 122; 74/110; 297/339, 347; 384/42

[56] References Cited

U.S. PATENT DOCUMENTS

| | | | |
|---|---|---|---|
| 2,480,916 | 9/1949 | Gibson | 254/9 C |
| 2,533,980 | 12/1950 | Weaver | 254/9 B |
| 3,282,566 | 11/1966 | Clarke | 254/122 |
| 3,554,598 | 1/1971 | Dunkin | 248/421 |
| 3,558,103 | 1/1971 | Lodige | 254/122 |
| 3,901,356 | 8/1975 | Butler | 254/122 |
| 4,125,242 | 11/1978 | Meiller et al. | 248/421 |
| 4,526,346 | 7/1985 | Galloway et al. | 254/122 |
| 4,534,544 | 8/1985 | Heide | 254/122 |
| 4,685,731 | 8/1987 | Migot | 297/339 |
| 4,738,081 | 4/1988 | Tisma | 384/42 |

FOREIGN PATENT DOCUMENTS 201272  12/1958  Austria ................. 254/9 C
136986  4/1985  European Pat. Off. .

Primary Examiner—Allan D. Herrmann
Attorney, Agent, or Firm—Lee & Smith

[57] ABSTRACT

A scissor mechanism is provided with two scissor arms (1,2) and a hydraulic cylinder (12) which extends between engagement points on the scissor arms (1,2) which are offset from the common bearing (3) of the scissor arms. Between the scissor arms there is provided a wedge mechanism (18,19) comprising a pressure roller (18) and a pressure wedge (19). The pressure roller (18) is mounted on a displaceable sleeve (15) which serves as the engagement point for the hydraulic cylinder at one of the scissor arms (1). By displacement of the sleeve (15) the scissor arms (1,2) are wedged out of their originally parallel position (FIG. 1).

4 Claims, 2 Drawing Sheets

SCISSOR MECHANISM IN PARTICULAR FOR LIFT TABLES

The present invention relates to a scissor mechanism in particular for lift tables as recited in the introductory part of claim 1. Such lift tables are widely used where there is a need for lifting heavy items from a position near the ground, where they can be picked up by for example a fork-lift truck or a lifting cart, into a position at about waist height so that they are conveniently accessible for handling.

A scissor mechanism of the kind presented in the introductory part of claim 1 is known from the European published patent application No. 0 136 986. The known scissor mechanism is provided with two pairs of scissor arms wherein each pair comprises two scissor arms which are pivotably journalled in a common bearing. A driving member in the nature of a hydraulic cylinder engages with engagement points offset from the common bearing on the scissor arms in such a way that the angle between the scissor arms may be changed, as long as they are not in parallel with each other, by changing the length of the driving member. The engagement point of the driving member on the innermost scissor arm of each of the scissor arm pairs may be displaced along the arm via a slit in the innermost scissor arm and is connected with a wedging mechanism provided between the scissor arms. The wedging mechanism consists of a pressure wedge and a pressure roller. The pressure roller is mounted on an elongated journal pin which extends through the slit in the scissor arm while the pressure wedge is fixed on the other scissor arm. The elements of this wedging mechanism are shaped in such a way that, when the scissor arms are in parallel with one another, they can be swung out of the parallel position by means of the wedging action brought about in the wedging mechanism when the displaceable engagement point which carries the pressure roller is displaced by activation of the hydraulic cylinder.

This known scissor mechanism, however, encompasses various constructive drawbacks. The biggest drawback may be that the elongated slit in the inner scissor arm causes a considerable weakening thereof. Furthermore, the elongated bolt which extends through the slit and carries the pressure roller must at the same time slide along through the slit and make a turning movement under a high load, namely the load from the weight of the goods which are to be lifted by the table. To prevent an unacceptably large wear both the bolt and the elongated slit must be finely machined for providing suitable bearing surfaces. Such fine machining carries rather large costs of manufacture with itself.

As seen in relation to this known art, it is the task of the invention to provide a scissor mechanism as recited in the introductory part of claim 1 and wherein the connection between the wedging mechanism and the driving member is provided in a way which is constructionally more satisfactory and stronger and wherein in particular the mentioned drawbacks are avoided.

According to the invention this task is accomplished by having the displaceable engagement point provided in the nature of a displaceable sleeve which surrounds the first scissor arm and which is connected to the driving member by means of a pivotable bearing, as recited in the characterizing part of claim 1.

In the construction according to the invention the rather significant drawbacks in the known construction are avoided in a surprisingly simple way. Instead of the concurrent displacement and turning of a bolt in a slit there is attained a division of the kinematic functions such that the one element of movement, namely the displaceable sleeve, executes a displacement movement only while the other element, namely the pivotable bearing, is only loaded by turning. Thus the wear on the elements is reduced and they become easier to machine.

The scissor arm and the surrounding sleeve can be dimensioned in such a way that they can be machined from standard semi-finished products. Furthermore, the mechanism is easy to assemble as the assembled sleeve can be slid over the scissor arm until it is in an operating position.

In the preferred embodiment of the invention as recited in claim 2 repair and maintenance of the scissor mechanism is simplified as a worn-out lining may be replaced by a new one.

A preferred embodiment of a scissor mechanism according to the invention will be described in the following with reference to the accompanying drawings.

Figure 1:
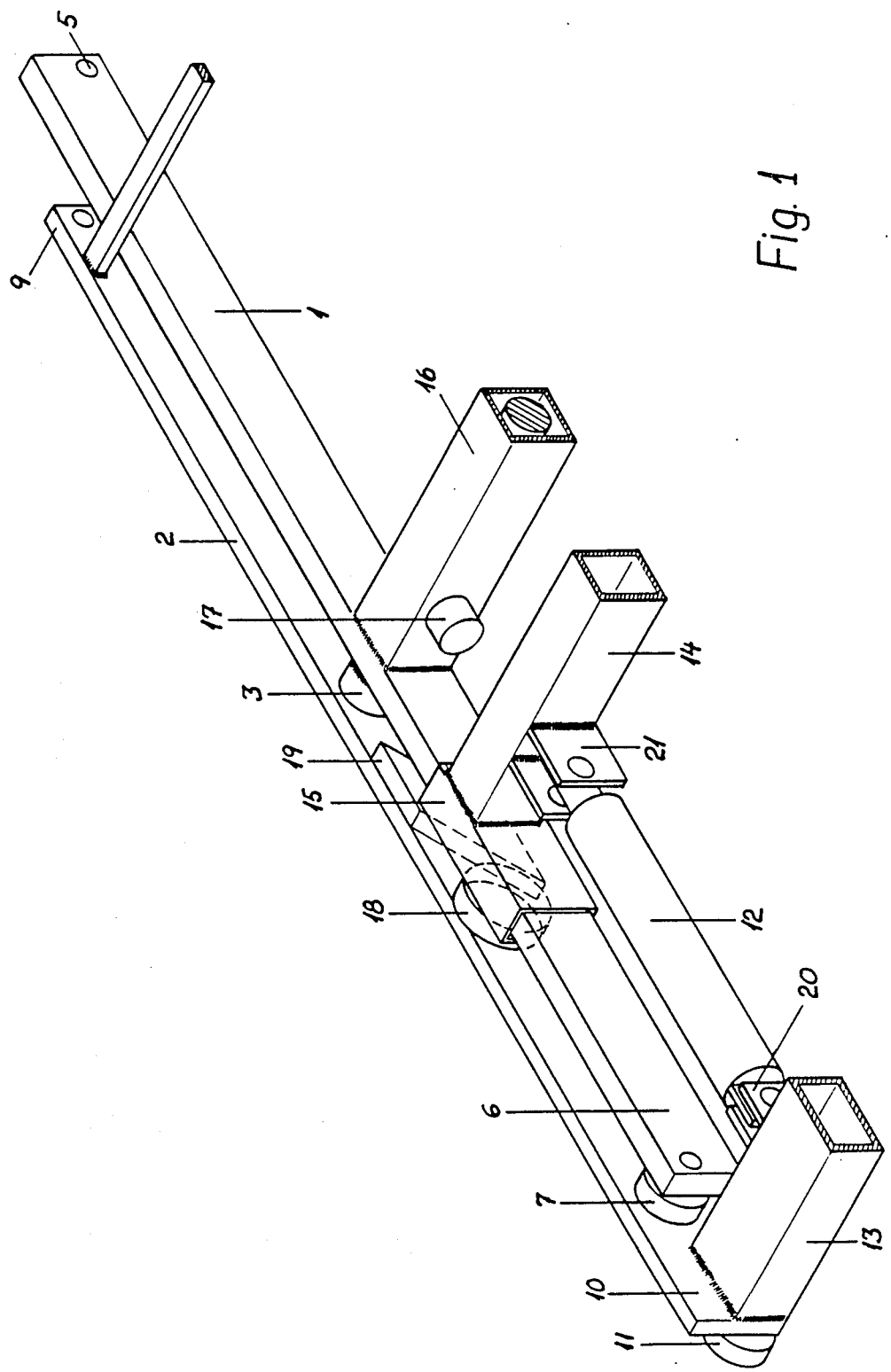
FIG. 1 shows a simplified perspective view of a scissor mechanism according to the invention.
Figure 2:
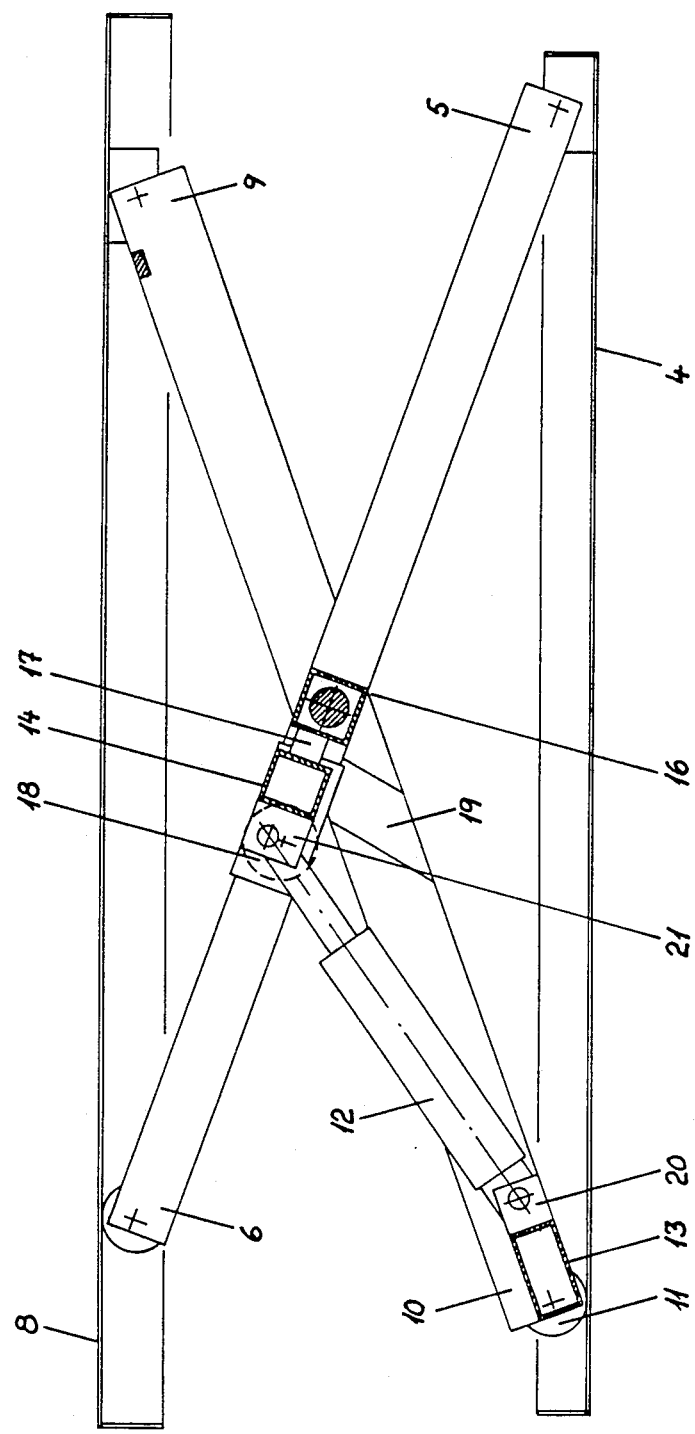
FIG. 2 shows the same scissor mechanism in a half raised position, viewed from the cutting plane indicated in FIG. 1.

The scissor mechanism shown in FIG. 1 comprises an inner (first) scissor arm 1 and an outer (second) scissor arm 2 which is pivotably journalled in relation to the first scissor arm in a common bearing 3. As it is seen in FIG. 2 the first scissor arm is pivotably connected with a bottom plate or bottom frame 4 at its first end, position 5, while its other end, position 6, is provided with a roller 7 which carries a table plate 8. Neither the bottom frame 4 nor the table plate 8 are shown in FIG. 1. Conversely the other scissor arm 2 is permanently connected with the table plate 8 at its first end 9, while its other end 10 is provided with a roller 11 resting on the bottom plate or bottom frame 4.

A driving mechanism in the nature of a hydraulic cylinder 12 is coupled into engagement with the scissor arms offset from the common bearing 3. One end of the hydraulic cylinder is connected to a cross-bar 13 which extends from one end 10 of the second scissor arm 2 which carries the roller 11. The other end of the hydraulic cylinder is connected to a cross-bar 14 which in turn is connected to a rectangular sleeve 15 which surrounds the first scissor arm approximately in the middle between the common bearing 3 and the end 6 which carries the roller 7.

The mechanism shown in FIG. 1 is one half of the mechanism which would normally be used in manufacturing a lift table. A corresponding mirror symmetric mechanism is to be thought co-extensive with the mechanism shown and extending from the cut planes on the cross-bars 13, 14 and 16.

The cross-bar 16 which extends from the common bearing 3 carries a stop 17 which serves as a stop for the longitudinal movement of the rectangular sleeve 15 and the cross-bar 14 along the first scissor arm 1. As can be seen in FIG. 2 the angle between the scissor arms 1 and 2 may be changed by activating the hydraulic cylinder 12 when the cross-bar 14 abuts the stop 17.

In order to make it possible by means of the hydraulic cylinder 12 to swing the scissor arms out of a position wherein they are parallel with each other there is fastened to the sleeve 15 a pressure roller 18 which runs up along a pressure wedge 19 on the other scissor arm 2 when the sleeve 15 is displaced along the scissor arm 1. The wedging action hereby obtained swings the scissor arms 1 and 2 out of their parallel position and remains in continuous action until the hydraulic cylinder 12 has been elongated so much that the cross-bar 14 abuts the stop 17 and the pressure roller 18 has left the pressure wedge 19.

In the construction as shown the connections 20, 21 between the hydraulic cylinder 12 and the cross-bars 13 and 14 are constructed as pivotable links, while the connection between the sleeve 15 and the scissor arm is a slide bearing only. Between the scissor arm 1 and the sleeve 15 there may, in particular on the lower side of the scissor arm, be provided a lining of a suitable bearing material, for example bearing nylon or PTFE which may then be replaced when it is worn out.

It should be remarked that the construction as shown does not necessarily require that the pressure roller 18 is mounted on the sleeve 15 and that the pressure wedge 19 is mounted on the scissor arm 2, because corresponding action could be attained by a similar construction in a reversed configuration. Furthermore, it should be remarked that the hydraulic cylinder 12 and the wedge mechanism with the elements 14, 15, 18 and 19 could also be provided on the opposite side of the common bearing 3, i.e. between the fixedly mounted ends 9 and 5 of the scissor arms and the common bearing 3. Still the placement at the loose or moving ends of the scissor arms is preferred because this contributes to the stability of the lifting table.

What is claimed is:

1. In a scissor mechanism for lift tables having two scissor arms which are pivotably journalled in a common bearing and having a driving member which is coupled between an engagement element on one of said scissor arms and an engagement element on the other of said scissor arms, said engagement elements being offset from the common bearing such that the angle between the scissor arms may be changed, as long as the scissor arms are not parallel to one another, by changing the length of the driving member, and wherein the engagement element on a first one of the scissor arms may be displaced along the arm and is connected to a two segment wedge mechanism located between the scissor arms, said wedge mechanism comprising a pressure wedge and a pressure roller, and wherein one of the segments of the wedge mechanism is connected to the displaceable engagement element and the other segment of the wedge mechanism is fixedly mounted on the other scissor arm such that the scissor arms, when parallel to one another, may be swung out of a parallel relationship by means of wedging action in the wedge mechanism created by displacing the displaceable engagement element, the improvement comprising the displaceable engagement element comprising a displaceable sleeve which surrounds the first scissor arm and is connected with the driving member by a pivotable link.

2. A scissor mechanism according to claim 1, including a lining of a bearing material located between the first scissor arm and the displaceable sleeve, in at least an area where forces are transmitted between the first scissor arm to the displaceable sleeve.

3. A scissor mechanism according to claim 2 in which said bearing material comprises a plastic material.

4. A scissor mechanism according to claim 1 in which said pivotable link comprises a cross bar secured to said sleeve, said driving member being connected to said cross bar by a pivot pin about which said drive member rotates relative to said cross bar.

* * * * *